Nov. 25, 1969  H. BAYER  3,480,862
FREQUENCY-SELECTIVE SIGNAL-TRANSMISSION SYSTEM
WITH LINEARITY-TESTING MEANS
Filed June 20, 1967  2 Sheets-Sheet 1

Herbert Bayer
INVENTOR.

BY
Karl F. Ross
Attorney

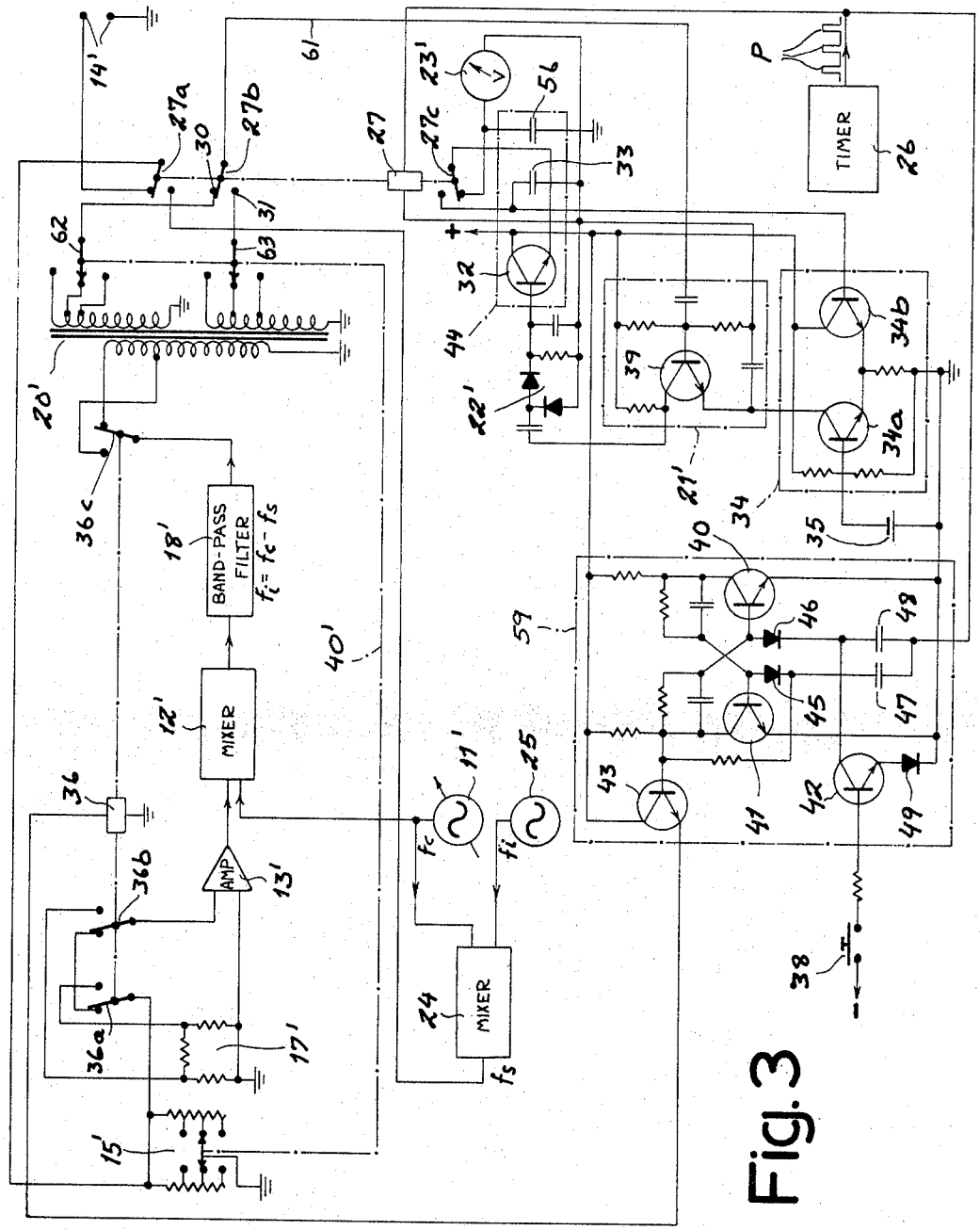

United States Patent Office 3,480,862
Patented Nov. 25, 1969

3,480,862
FREQUENCY-SELECTIVE SIGNAL-TRANSMISSION SYSTEM WITH LINEARITY-TESTING MEANS
Herbert Bayer, Reutlingen, Germany, assignor to Wandel & Goltermann, Muhleweg, Germany
Filed June 20, 1967, Ser. No. 647,423
Claims priority, application Germany, June 22, 1966, W 41,833
Int. Cl. G01r 1/02
U.S. Cl. 324—130                                    10 Claims

ABSTRACT OF THE DISCLOSURE

To determine the linearity of signal-level measurements in a test circuit having an overload-prone broad-band active input element, such as an amplifier or a modulator, followed by a frequency selector, a rectifier and a voltage indicator, a predetermined damping increment is introduced in the input; if distortion is present, the change in indicator reading will not be proportional to the effective reduction in signal voltage due to the added damping. The change in signal strength caused by the varying damping factor is a small fraction of the rated amplitude range of the input stage and is independent of any attenuation that may be provided to scale down an applied signal voltage exceeding that range.

---

Figure 1:
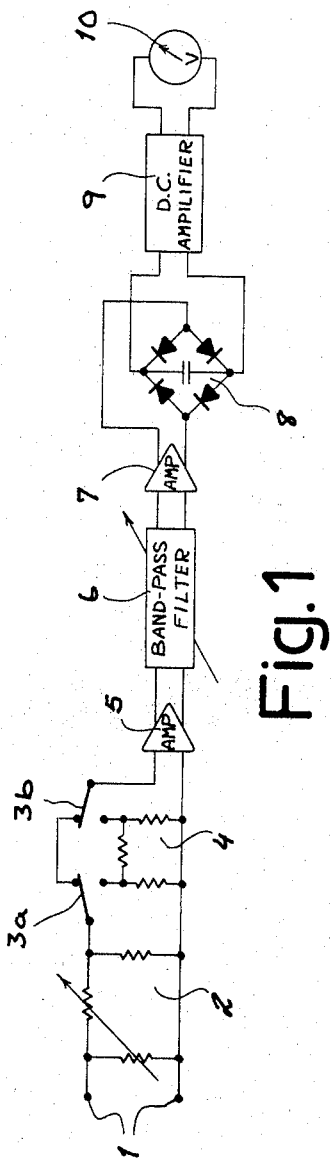

My present invention relates to the measuring of signal strength by means of a frequency-selective test circuit.

In the performance of such measurements it is customary to use a broad-band input stage to which input signals of mixed frequencies are applied and which is followed by a frequency selector and a voltage indicator, the latter usually including a rectifier and a direct-current voltmeter. The input stage generally contains one or more active elements, such as an amplifier and/or a modulator, operating with a reasonable degree of linearity within a predetermined range of signal voltages. Beyond that range, owing to the development of harmonics and/or modulation products, distortion will occur which tends to falsify the reading of the indicator.

It is, of course, well known to include in the input stage, ahead of the active element or elements, a range selector such as a voltage divider for the purpose of scaling down the strength of the input signal whenever the active element and/or the indicator tend otherwise to be overloaded. Such voltage dividers operate in discrete steps of attenuation, e.g. according to a decadic system, so chosen that the rated amplitude range of the input stage should be utilized as fully as possible. With an input signal surpassing that range for a given setting of the voltage divider, the latter can be adjusted to attenuate the signal by one or more steps until the deflection of the voltmeter needle or equivalent indicating means is reduced to fall within predetermined limits. Conversely, the attenuation may be diminished for low-amplitude signals to give a more accurate reading with a wider scale spread. This resetting of the input attenuator constitutes a relatively coarse range shift and sometimes requires a concomitant readjustment of the transmission losses between the frequency selector and the indicator, in comparatively small steps, in order to insure a correct reading of the indicator in each of the several voltage ranges. Such readjustment is carried out most expeditiously by a pair of ganged switches respectively controlling the input attenuator and a balancer connected between the frequency selector and the indicator.

The range of linear operation is, however, not the same for all measuring frequencies. It is, therefore, not possible to design the range selector, i.e. the input attenuator and its balancer, in such a way that the reading of the indicator, within its measuring range, will always be proportional to the signal level at a selected frequency. Thus, the active element of the input stage may be overdriven to generate undesired harmonics (the so-called "Kerr" effect) well within the normal operating limits of the test circuit, thereby giving an incorrect reading at least for certain frequencies.

It is, therefore, the general object of my present invention to provide means in such test circuit for allowing an operator to ascertain, at a glance, the presence of any distortion tending to falsify the meter reading.

A more particular object of this invention is to provide such linearity-testing means in a system equipped with a calibrating arrangement which automatically compensates for any (e.g. frequency-dependent) reading error.

According to a feature of my present invention, the linearity-testing means provided for the aforestated purpose includes a manually or automatically operable switch for temporarily introducing a predetermined damping increment into the input of the amplifier or other active element of the input stage. The change is signal level due to introduction of this damping increment should be only a small fraction of the rated operating range of the overload-prone active element so as to be usable with different signal levels within that range. If the system operates linearly, the insertion of the damping increment will cause a predetermined change in the reading of the associated indicator; any observed deviation from this predetermined change will alert the operator to the fact that distortion is present and that, therefore, the input attenuator should be reset to a higher voltage range.

According to a more specific feature of my invention, I provide the output of the frequency selector (ahead of the indicator) with an adjustable impedance, such as a resistance network or a transformer, which is switched concurrently with the insertion of the damping increment to control the volume at that point in an exactly compensatory manner, thereby maintaining the indicator reading constant if the system operates linearly. Any change in indicator reading with insertion of the damping increment can then be taken as a sign of distortion.

With automatic calibration, involving the periodic switching of the input stage between a test signal to be measured and a constant-amplitude reference signal, the switchover into a linearity-testing condition (with introduction of the predetermined damping increment) should be so timed as to maintain that condition over at least one full calibrating cycle; this is accomplished, pursuant to a further feature of my invention, with the aid of an electronic actuator, such as a multivibrator circuit, connected to be tripped by pulses from a timer upon operation of a start switch to initiate a linearity-testing interval. In this way, the calibration circuit also operates to compensate for any mismatch between the damping increment at the input and the compensatory volume control at the output of the frequency selector.

It is to be understood that, in principle, the term "damping increment" as used herein may be either additive or subtractive. I prefer, however, to make the increment positive, i.e. to provide for the effective insertion of a small resistance (e.g. one designed to change the signal level by −1 db) during linearity testing, in order to reduce losses in normal measuring operations and to avoid artificially overloading an amplifier working at the upper limit of its linear range. If the system includes a heterodyning stage ahead of a frequency selector, which in that case may be in the form of a fixed filter passing a predetermined intermediate frequency, the compensatory volume control may be effected by a reactive impedance in lieu of a resistance which would otherwise be necessary to insure frequency-independent compensation. Use of such reactive adjustment, as by switching between two terminals of a winding of a transformer to change its effective turns ratio, avoids the introduction of additional ohmic losses during measurement.

Figure 2:
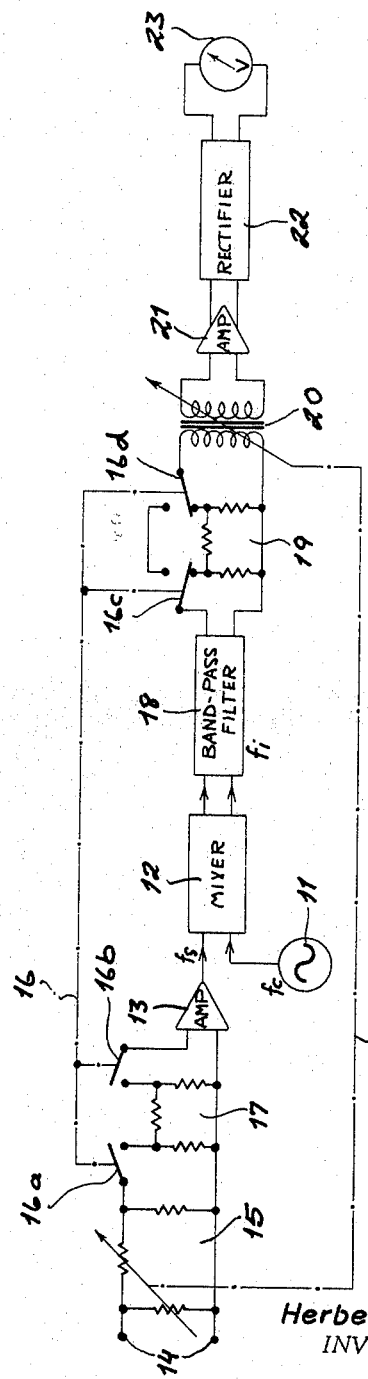

The above and other features of my invention will be described in greater detail with reference to the accompanying drawing in which FIGS. 1, 2 and 3 diagrammatically illustrate, partly in block form, three representative embodiments.

In FIG. 1 I have shown a circuit arrangement comprising a pair of input terminals 1 across which a mixed-frequency signal can be applied. Terminals 1 lead to an attenuation pad 2 which is adjustable in discrete steps to allow for the measurement of different ranges of input voltage. Another resistance network 4, designed to introduce a small damping increment of predetermined magnitude (e.g. 1 db), is normally disconnected by contacts 3a 3b of a manual switch not further illustrated. The signals from attenuator 2 transverse a broad-band amplifier 5 working into a frequency selector 6 here shown as a tunable filter. A further amplifier 7 receives the monochromatic output of selector 6 and delivers it to a rectifier 8 feeding, through a D-C amplifier 9, an indicator in the form of a voltmeter 10.

Changing the tuning of band-pass filter 6 allows the selection of different signal frequencies whose level can be read on the meter 10. If, with a given setting of voltage divider 2, the amplifier 5 is overdriven by the frequency to be measured, the reading of meter 10 will be inaccurate. In order to ascertain whether this reading is true, the operator may reverse the switch 3a, 3b to insert the resistance pad 4 in the circuit. Any nonlinearity of the gain of amplifier 5 will then lead to a shift in the voltmeter reading different from that which would be proportional to the damping increment introduced.

In FIG. 2 I have shown a modification of the system of FIG. 1 with input terminals 14, voltage divider 15, resistance pad 17 and broad-band amplifier 13. Frequency selection is here accomplished by a heterodyning circuit comprising an adjustable oscillation generator 11, producing a variable carrier frequency $f_c$, and mixer 12 which derives from a selected signal frequency $f_s$ a fixed measuring frequency, here the intermediate frequency $f_i = f_c - f_s$, passed by a narrow-band-pass filter 18 in the output of mixer 12. Another resistance pad 19 and an adjustable transformer 20 are connected in cascade between the output of filter 18 and the input of a voltage indicator whose elements 21, 22, 23 correspond to the units 8, 9 and 10 of FIG. 1.

A switch 16, indicated diagrammatically, comprises two armatures 16a, 16b for bridging the resistance pad 17 and two armatures 16c, 16d for similarly bridging the pad 19. These two pairs of armatures are arranged to operate in a complementary manner, i.e. with effective insertion of pad 17 during disconnection of pad 19 and vice versa; in the presence of an input signal $f_s$ of given amplitude, and with active elements 12, 13 operating on the linear portions of their amplitude/gain characteristics, the change in signal level due to reversal of switch contacts 16a, 16b will be exactly compensated, as seen on indicator 21–23, by the simultaneous reversal of switch contacts 16c, 16d. Thus, linear operation will be characterized by the absence of any movement of the needle of voltmeter 23 during such switchover. Transformer 20 is ganged with voltage divider 15, via a linkage 60, to perform the necessary balancing upon a shaft from one voltage range to another.

In FIG. 3 I have shown a system embodying substantially the same elements as those of FIG. 2, with the inclusion of means for the automatic and repetitive calibration of the voltmeter. Components corresponding to those of FIG. 2 have been designated in FIG. 3 by the same reference numerals with addition of a prime mark and, for the most part, need not be described again.

Input terminals 14' are connectable across voltage divider 16' by an armature 27a of a relay 27 periodically operated by pulses P from a timer 26; pulses P may have a recurrence rate of, say, one second and a width equal to a small fraction thereof, e.g. of 50 milliseconds. Relay 27 also has a second armature 27b, serving to switch an input lead 61 of intermediate-frequency amplifier 21' between two alternate output terminals 30, 31 of transformer 20', and a third armature 27c for intermittently connecting the input of voltmeter 23' to the emitter of a transistor 32. Upon energization of relay 27, armature 27a connects the input of attenuator 15' to the output of a mixer stage 24 which generates a variable calibrating frequency $f_s$ (identical with the signal frequency selected by the adjustment of oscillator 11') from a combination of carrier frequency $f_c$ with the output of a fixed-frequency oscillator 25. The latter oscillator produces the intermediate frequency $f_i$ passed by filter 18', with $f_s = f_c - f_i$ as in the previous embodiment. Switch 16 of FIG. 2 has been replaced by a relay 36 with armatures 36a, 36b for the intermittent shunting of pad 17' and a further armature 36c for alternately connecting the output of filter 18' to different taps on the primary of transformer 20'. Output terminal 30 of that transformer is energized by a wiper 62 which is ganged with voltage divider 15' to perform the aforedescribed balancing operation during level measurements; output terminal 31 is energized from another slider 63, also ganged with voltage divider 15', which compensates for any readjustment of the latter to fix the output voltage of transformer 20' at a predetermined level, independent of the setting of attenuator 15', during calibration.

Intermediate-frequency amplifier 21' includes a transistor 39 whose emitter is grounded through another transistor 34a which, together with a companion transistor 34b, constitutes a differential amplifier 34. A fixed biasing voltage from a D-C source, shown as a battery 35, is applied to the base of the transistor 34a as a standard of comparison with the base voltage of transistor 34b which is taken from the ungrounded terminal of a storage condenser 33 in a switchover network 44. The latter network includes a transistor 32, energized from the output of rectifier stage 22', whose emitter is tied to relay armature 27c which alternately connects it to condenser 33 (and thus to the base of transistor 34b) and to the input of voltmeter 23' which is shunted by another storage condenser 56. The two capacitors 33, 56 are designed to hold a substantially constant charge during the brief intervals of their disconnection from transistor 32. Capacitor 33, therefore, prevents sudden changes in the conductivity of differential amplifier 34 (and therefore in the gain of amplifier 21') whereas capacitor 56 stabilizes the position of voltmeter 23' and suppresses the effect of switching transients upon its needle.

Relay 36, whose armatures control the insertion of pad 17' and the effective turns ratio of transformer 20', is shown connected in series with the emitter of a transistor 43 forming part of a timing network 59. The base of this transistor is connected to an output terminal of a multivibrator consisting of two further transistors 40, 41, specifically to the collector of transistor 41. The pulses P from timer 26 are applied in parallel to the bases of multivibrator transistors 40, 41 via respective rectifiers 45, 46 and coupling condensers 47, 48. The junction of rectifier 46 and condenser 48 is also connected to the collector of a transistor 42 whose emitter is grounded through a rectifier 49 and whose base is connected to a normally open start switch represented by a key 38; upon normal closure of this switch, a blocking potential (here negative) is applied to the base of the normally conductive transistor 42.

In the normal operation of the system illustrated in FIG. 3, pulses P periodically energize the relay 27 for an interval of, say, 50 ms. out of every second. During such energization, the constant-amplitude reference signal of frequency $f_s$ from mixer 24 passes the amplifier 13' and produces in the mixer 12' the intermediate frequency $f_i$ which clears the filter 18' and, after passage through amplifier 21' and rectifier 22', charges the condenser 33 to a potential determined by the gain of amplifier 21'. If this potential differs from the biasing potential of battery 35, differential amplifier 34 makes a corrective readjustment of amplifier 21' whose gain is thereafter held substantially constant, for the remainder of the cycle, by the charge on capacitor 33. When the relay 27 releases, the multifrequency signal to be tested is reapplied to the input of amplifier 13' and again produces an intermediate frequency $f_i$, of an amplitude depending on the level of the particular signal frequency selected by the setting of oscillator 11', which now charges the condenser 56 and actuates the voltmeter 23'. The timing pulses P on the base lead of transistor 40 are shunted to ground through transistor 42 without tripping the multivibrator whose transistor 41 is thus continuously conductive at this time. Under these conditions, transistor 43 is cut off and relay 36 is unoperated.

When the user closes the contacts of key 38, transistor 42 is blocked. The next timing pulse P, therefore, trips the multivibrator so that transistor 41 thereof ceases to conduct and transistor 40 becomes conductive. This action biases the transistor 43 above cut-off so that relay 36 is energized. Since this energization coincides with the operation of relay 27 by the pulse P, the system is in its calibrating position (with armature 27c connected to condenser 33) at the instant when pad 17' is first connected in circuit. Any disparity between the damping increment due to the insertion of this pad and the increase in the step-up ratio of tranformer 20' due to reversal of armature 36c, manifesting itself as a difference between the input voltages of amplifier 34, is immediately compensated by the automatic readjustment of the gain of amplifier 21'. Thus, the reading of voltmeter 23' in the following cycle portion, upon release of relay 27, accurately reflects any nonlinearity in the operation of amplifier 13' and/or mixer 12' and remains constant only if these components operate on a linear part of their respective amplitude/gain characteristics.

Since the state of conductivity of the multivibrator 40, 41 changes with every pulse P, the voltmeter 23' responds during alternate cycles to signals traversing and bypassing, respectively, the linearity-testing pad 17' which is inserted in the circuit during every other cycle. Thus, the operator can readily ascertain whether the needle of the voltmeter oscillates or remains fixed during prolonged depression of key 38. Moreover, a release of that key (if occurring during conduction of transistor 40) will not become effective until the timing pulse P at the beginning of the next operating cycle restores the multivibrator to normal by triggering its transistor 41 into a conductive condition. This arrangement insures, therefore, that the switching into a linearity-testing state always occurs at the beginning of a calibrating cycle, regardless of the moment of actuation of start key 38, and remains in effect for a full calibrating cycle, or for a plurality of such cycles separated by regular measuring cycles.

I claim:

1. A circuit arrangement for measuring the amplitudes of individual frequencies of a mixed-frequency input signal, comprising a broad-band input stage with an active element receiving said input signal; adjustable frequency-selector means in the output of said active element; voltage-indicator means connected to receive and measure the output of said frequency-selector means; and linearity-testing means including switch means for temporarily introducing a predetermined damping increment into the input of said active element, said active element having a rated operating range with a spread of signal levels substantially greater than the change in signal level due to introduction of said damping increment, said change in signal level being of such limited magnitude as to be confined to a linear portion of said rated operating range in the presence of an input signal of an intensity insufficient to overdrive said active element beyond said linear portion.

2. A circuit arrangement as defined in claim 1 wherein said linearity-testing means further comprises volume-control means in the output of said frequency-selector means coupled with said switch means for exactly compensating, under linear operating conditions, the effect of said damping increment upon the reading of said voltage-indicator means.

3. A circuit arrangement as defined in claim 2 wherein said frequency-selector means includes a variable-frequency oscillator, mixer means for combining the output of said oscillator with signals from said input stage, and a narrow-band-pass filter for selecting a constant intermediate frequency from the output of said mixer means and applying said intermediate frequency to said voltage-indicator means via said volume-control means.

4. A circuit arrangement as defined in claim 3 wherein said volume-control means comprises a transformer with a tapped winding forming a pair of alternate terminals.

5. A circuit arrangement as defined in claim 3, further comprising calibrating means effective independently of said switch means for temporarily replacing said mixed-frequency signal by a fixed-amplitude reference signal in the input of said active element, said reference signal having a frequency capable of modulation in said mixer means to produce an oscillation passed by said filter.

6. A circuit arrangement as defined in claim 1, further comprising attenuation means ahead of said input stage adjustable in discrete steps each substantially commensurate with the extent of said rated operating range.

7. A circuit arrangement for measuring the amplitudes of individual frequencies of a mixed-frequency input signal, comprising a broad-band input stage with an active element receiving said input signal; adjustable frequency-selector means in the output of said active element including a variable-frequency oscillator, mixer means for combining the output of said oscillator with signals from said input stage, and a narrow-band-pass filter for selecting a constant intermediate frequency from the output of said mixer means; voltage-indicator means connected to receive the output of said frequency-selector means; linearity-testing means including switch means for temporarily introducing a predetermined damping increment into the input of said active element and volume-control means in the output of said frequency-selector means coupled with said switch means for exactly compensating, under linear operating conditions, the effect of said damping increment upon the reading of said voltage-indicator means, said active element having a rated operated range with a spread of signal levels substantially greater than the change in signal level due to introduction of said damping increment; and calibrating means effective independently of said switch means for temporarily replacing said mixed-frequency signal by a fixed-amplitude reference signal in the input of said active element, said reference signal having a frequency capable of modulation in said mixer means to produce an oscillation passed by said filter, said calibrating means including a source of timing pulses and switchover means responsive to said timing pulses for periodically applying said reference signal and said mixed-frequency signal to said input stage during a first and a second part, respectively, of an operating cycle.

8. A circuit arrangement as defined in claim 7 wherein said switch means includes manually operable start contacts, an electronic actuator primable by operation of said contacts to respond to said timing pulses, and relay means connected to be tripped by said actuator at the beginning of an operating cycle of said calibrating means following operation of said contacts.

9. A circuit arrangement as defined in claim 8 wherein said actuator comprises a multivibrator having an output connected to said relay means for energizing same during alternate operating cycles in the operated state of said contacts.

10. A circuit arrangement as defined in claim 7, further comprising attenuation means ahead of said active element adjustable in relatively coarse steps compared with said damping increment, and an adjustable impedance in the output of said frequency-selector means controlled by said switchover means to compensate for the effect of said attenuation means during application of said reference signal.

References Cited

UNITED STATES PATENTS

| 2,666,098 | 1/1954 | Leonard | 330—2 XR |
| 3,018,439 | 1/1962 | Burrow | 324—118 XR |

OTHER REFERENCES

McCarthy, S.: Hewlett-Packard Journal, vol. 14, No. 5-6, January-February, 1963, pp. 1-5.

RUDOLPH V. ROLINEC, Primary Examiner

A. E. SMITH, Assistant Examiner

U.S. Cl. X.R.

324—74, 128